(12) United States Patent
Strock

(10) Patent No.: US 10,662,517 B2
(45) Date of Patent: May 26, 2020

(54) ALUMINUM FAN BLADE TIP PREPARED FOR THERMAL SPRAY DEPOSITION OF ABRASIVE BY LASER ABLATION

(71) Applicant: United Technologies Corporation, Farmington, CT (US)

(72) Inventor: Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/235,346

(22) Filed: Aug. 12, 2016

(65) Prior Publication Data

US 2018/0044771 A1 Feb. 15, 2018

(51) Int. Cl.
| | | |
|---|---|---|
| *C23C 4/02* | (2006.01) | |
| *B23K 26/352* | (2014.01) | |
| *C23C 4/12* | (2016.01) | |
| *F01D 5/28* | (2006.01) | |
| *C23C 28/00* | (2006.01) | |
| *B23K 26/361* | (2014.01) | |

(Continued)

(52) U.S. Cl.
CPC ............ *C23C 4/02* (2013.01); *B23K 26/3584* (2018.08); *C23C 4/12* (2013.01); *C23C 28/00* (2013.01); *F01D 5/288* (2013.01); *B05B 7/16* (2013.01); *B23K 26/361* (2015.10); *B23K 26/362* (2013.01); *F01D 11/122* (2013.01); *F05D 2220/36* (2013.01); *F05D 2230/13* (2013.01); *F05D 2230/31* (2013.01); *F05D 2240/14* (2013.01); *F05D 2240/307* (2013.01); *F05D 2300/121* (2013.01); *F05D 2300/611* (2013.01)

(58) Field of Classification Search
CPC ... C23C 4/02; C23C 4/12; F01D 5/288; F01D 11/122; B05B 7/16; B23K 26/0078; B23K 26/127; B23K 26/362; F05D 2300/121; F05D 2300/611; F05D 2220/36; F05D 2240/14; F05D 2240/307
USPC ....... 427/449, 451, 452, 453, 534, 554, 140, 427/142; 118/715, 300, 302, 309, 323, 118/72
See application file for complete search history.

(56) References Cited

U.S. PATENT DOCUMENTS

| | | | | |
|---|---|---|---|---|
| 4,884,820 A | * | 12/1989 | Jackson | .................. C21D 1/09 277/415 |
| 5,113,582 A | * | 5/1992 | Monson | .................. B23P 6/002 29/889.1 |

(Continued)

FOREIGN PATENT DOCUMENTS

| | | | | |
|---|---|---|---|---|
| EP | 0580534 A1 | * | 1/1994 | ............... C23C 4/02 |
| EP | 0580534 A1 | | 1/1994 | |

OTHER PUBLICATIONS

Laserglow technologies (available Feb. 1, 2014, hereafter Laserglow), found at https://www.laserglow.com/page/modulation (Year: 2014).*

(Continued)

*Primary Examiner* — Jose Hernandez-Kenney
(74) *Attorney, Agent, or Firm* — Bachman & LaPointe, P.C.

(57) ABSTRACT

A process of preparing a blade tip for abrasive coating includes forming a hydroxide layer on a surface of the blade tip. The process includes ablating the hydroxide layer from the surface with a laser. The process includes roughening the surface with the laser after the hydroxide layer ablation.

12 Claims, 4 Drawing Sheets

(51) Int. Cl.
*B05B 7/16* (2006.01)
*B23K 26/362* (2014.01)
*F01D 11/12* (2006.01)

(56) References Cited

U.S. PATENT DOCUMENTS

| | | | | |
|---|---|---|---|---|
| 6,037,004 | A * | 3/2000 | Zajchowski | B05B 12/20 427/282 |
| 8,628,624 | B2 | 4/2014 | Turner et al. | |
| 2007/0098987 | A1 * | 5/2007 | Huddleston | C22C 19/05 428/402 |
| 2008/0085368 | A1 * | 4/2008 | Gauthier | C23C 14/28 427/314 |
| 2010/0129636 | A1 * | 5/2010 | Cybulsky | C04B 41/009 428/310.5 |
| 2015/0240364 | A1 | 8/2015 | Reiche et al. | |

OTHER PUBLICATIONS

Mccafferty, E., and J. P. Wightman. "Determination of the concentration of surface hydroxyl groups on metal oxide films by a quantitative XPS method." Surface and Interface Analysis26, No. 8 (1998): 549-64. (Year: 1998).*

Machine translation of EP0580534 (Year: 1994).*

Gudmundsson, Snorri. 2014. "Selecting the Power Plant." In General Aviation Aircraft Design: Applied Methods and Procedures, 181-234. Amsterdam: Elsevier (Year: 2014).*

C. Coddet et al., Surface preparation and thermal spray in a single step: The PROTAL process—Example of application for an aluminum-base substrate, Journal of Thermal Spray Technology Jun. 1999, vol. 8, Issue 2, pp. 235-242.

Frank L. Palmieri*, Allison Crow†, Anna Zetterberg†, John Hopkins*, Christopher J. Wohl*, John W. Connell*, Marcus A. (Tony) Belcher‡, and Kay Y. Blohowiak‡, Further Investigation into the Use of Laser Surface Preparation of Ti—6Al—4V Alloy for Adhesive Bonding, NASA Langley Research Center, Hampton, VA 2368-2199; †NASA Langley Aerospace Research Summer Scholars, Hampton, VA 2368-2199; ‡The Boeing Company, Seattle, WA 98124-2207, Mar. 2014.

European Search Report for EP 17186192.5 dated Nov. 17, 2017.

* cited by examiner

ALUMINUM FAN BLADE TIP PREPARED FOR THERMAL SPRAY DEPOSITION OF ABRASIVE BY LASER ABLATION

BACKGROUND

This disclosure relates to a process for preparing abrasive tips for thermal spray deposition.

The abrasive tips include coatings to enhance performance and limit heat generation and heat transfer to the blade. The abrasive tips are applied by thermal spray deposition. The blade substrate base metal surface is prepared for thermal spray deposition.

Achieving a good bond between aluminum fan blades and aluminum matrix abrasive coating is highly dependent on preparation of the base metal. The aluminum base alloy is processed with alkali cleaning methods or simply exposed to moisture in the air which creates an aluminum hydroxide layer. The aluminum hydroxide layer interferes with adhesion of the aluminum matrix thermally sprayed abrasive tip coating. That hydroxide layer cannot be removed effectively by grit blast.

The current process is to abrade the tip by hand with a ScotchBrite pad, perform a grit blast step and then use the plasma torch to further clean and heat the blade tip. This cleaning and preheat is responsible for bringing coating bond strength from less than 1 kilo-pounds per square inch (ksi) to the current level of about 6-9 ksi. There is risk that as production volume builds, the hand operation may become more variable and result in sporadic low bond strength products.

What is needed is a coating preparation process that eliminates the hand process for cleaning the blade tip and improves repeatability of the process. It would be further beneficial to reduce preparation and preheat time.

SUMMARY

In accordance with the present disclosure, there is provided an apparatus for preparation and thermal spray deposition of components comprising a thermal spray chamber having a work table configured to hold the component; a thermal spray torch mounted in the thermal spray chamber, the thermal spray torch configured to apply a coating to the component; and a laser mounted in the thermal spray chamber, the laser configured to at least one of ablate at least one layer on the component and laser ablation roughening at least one surface of the component.

In accordance with the present disclosure, there is provided an apparatus for preparation and thermal spray deposition of a component comprising a laser configured to at least one of ablate at least one layer on the component and configured to laser ablation roughen at least one surface of the component.

In another and alternative embodiment, a thermal spray torch configured to apply a coating to at least one laser ablation roughened surface.

In another and alternative embodiment, the thermal spray torch is mounted in a thermal spray chamber.

In another and alternative embodiment, the at least one layer comprises a hydroxide layer.

In another and alternative embodiment, the component comprises an aluminum blade.

In another and alternative embodiment, the laser comprises a square wave output.

In another and alternative embodiment, the coating comprises an abrasive tip coating.

In another and alternative embodiment, the laser ablation roughened surface comprises a design surface texture.

In another and alternative embodiment, a coating is applied to the laser ablation roughened surface of the component; wherein the coating is selected from the group consisting of a spray paint, a primer and a powder coating.

In accordance with the present disclosure, there is provided a process of preparing a blade tip for abrasive coating comprising forming a first layer on a surface of the blade tip; ablating the first layer from the surface with a laser; and roughening the surface with the laser during the first layer ablation.

In another and alternative embodiment, the process further comprises preheating the surface with the laser prior to coating the surface.

In another and alternative embodiment, the first layer comprises at least one of a polymer based layer, an erosion resistant layer and a hydroxide layer In another and alternative embodiment, the hydroxide layer is formed after alkali cleaning the surface or exposure to air containing humidity.

In another and alternative embodiment, the process further comprises coating the surface with an abrasive.

In another and alternative embodiment, the steps of ablating, roughening and coating are performed in a thermal spray chamber.

In another and alternative embodiment, the process further comprises forming a designed surface texture from the laser ablation roughening.

In another and alternative embodiment, the roughening step comprises laser ablation roughening.

Other details of the coating preparation process are set forth in the following detailed description and the accompanying drawing wherein like reference numerals depict like elements.

DETAILED DESCRIPTION

Figure 1:
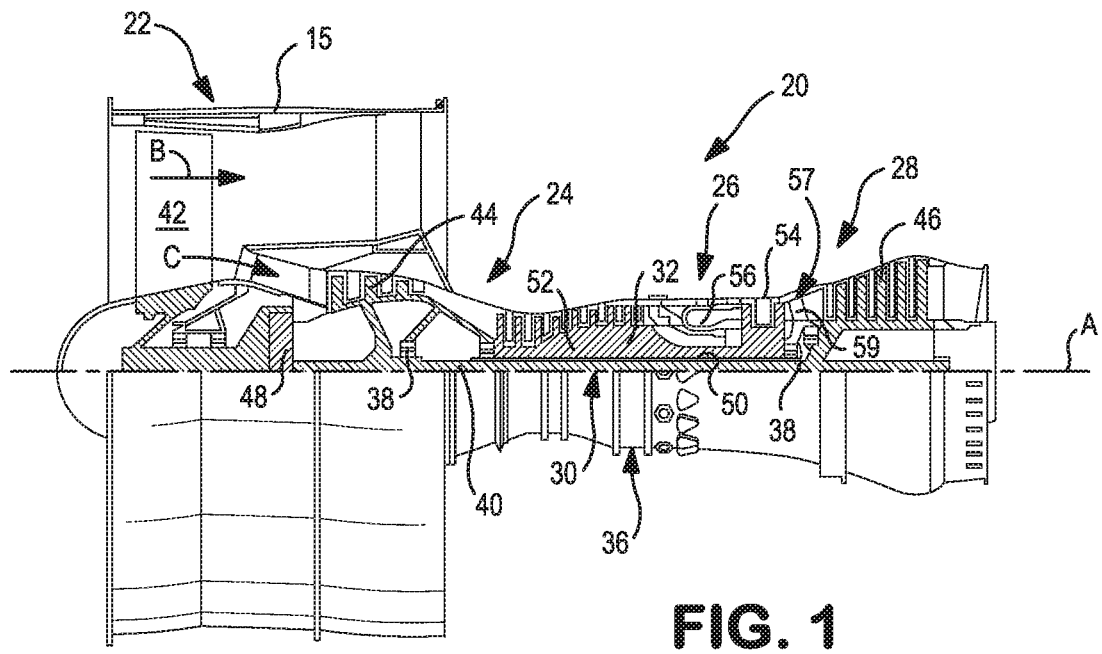
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a fan case 15, and into a core flow path C to the compressor section 24 for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

Figure 2:
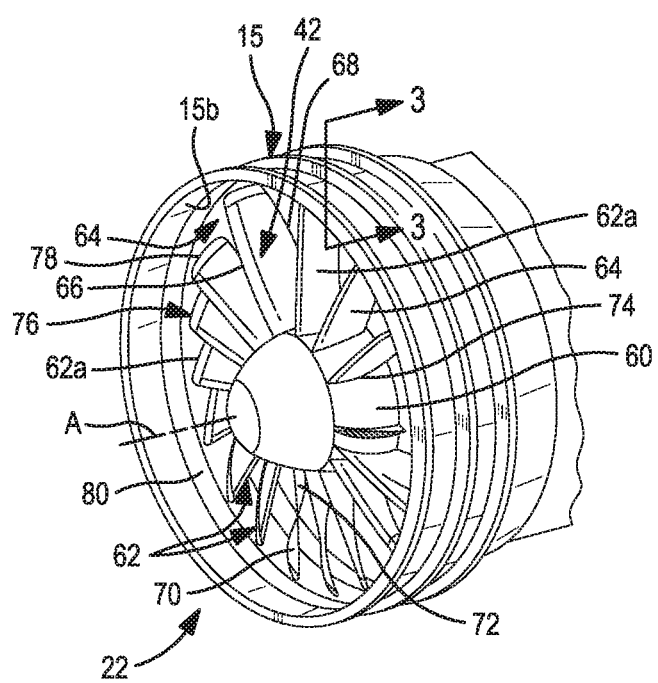
FIG. 2 illustrates an isolated view of the fan section of the gas turbine engine of FIG. 1.

FIG. 2 illustrates an isolated view of the fan section 22 of the engine 20. The fan 42 includes a rotor 60 that has a plurality of circumferentially-spaced blades 62. Each blade 62 includes an airfoil section 64 that extends between leading and trailing edges 66/68, first and second opposed sides 70/72 that each joins the leading and trailing edges 66/68, and an inner end 74 and a free tip end 76. Each blade includes an abrasive tip 78 at the free tip end 76.

The fan case 15 is annular in shape and circumscribes the blades 62. The fan section 22 is designed such that the abrasive tips 78 of the blades 62 rub against the fan case 15 during rotation. In this regard, the fan case 15 includes an abradable seal 80 mounted on a radially inner side of the fan case 15.

Figure 3:
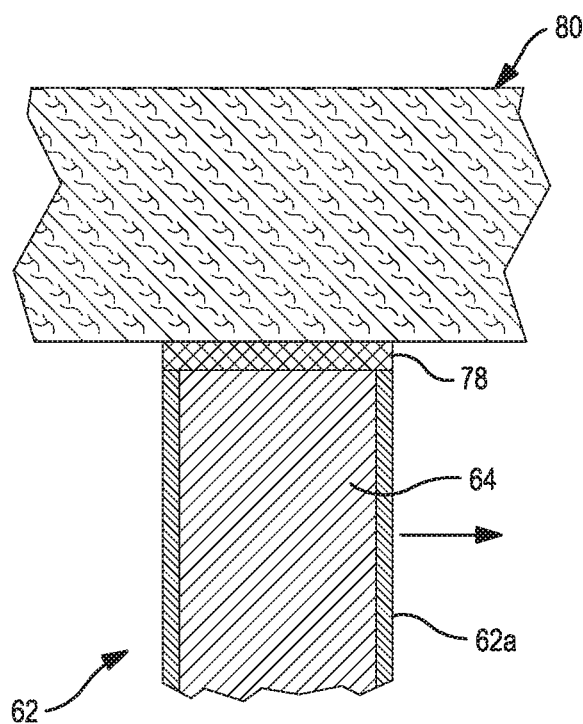
FIG. 3 illustrates an abrasive tip interfacing with an abradable seal.

FIG. 3 shows a cutaway view of a representative portion of the airfoil section 64 of one of the blades 62 and a portion of the abradable seal 80. The airfoil section 64 is formed of a metal-based material with a polymeric overcoat 62a on the surfaces thereof. The polymeric overcoat 62a is applied after coating when the blade 62 is made. If the blade 62 is overhauled, the polymeric overcoat 62a can be on the blade. For example, the polymeric overcoat 62a serves to protect the underlying airfoil section 64 from erosion due to foreign particulate ingested into the engine 20. In one example, the metal-based material of the airfoil section 64 is an aluminum alloy.

Figure 4:
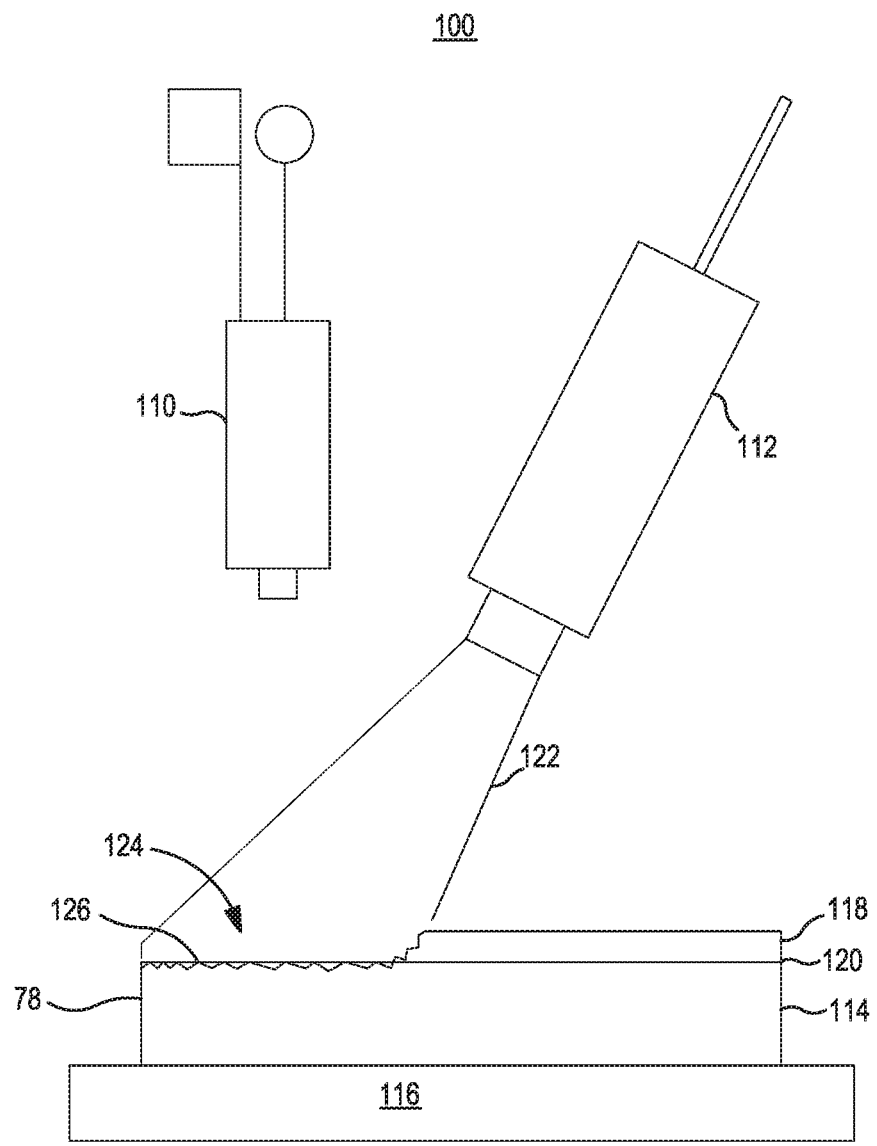
FIG. 4 illustrates an exemplary preparation and coating device.

FIG. 4 shows an exemplary thermal spray booth or chamber 100. Within the thermal spray booth 100 a thermal spray torch 110 and a laser device 112 are mounted to apply a coating and a surface preparation respectively. In an exemplary embodiment, the coating can include a spray paint, a primer, a powder coat, and the like. The coating can be applied by sprayer, brush, roller, dip and the like.

A substrate 114 of the tip 78 is mounted to a work table 116. In an exemplary embodiment, the substrate 114 can comprise aluminum alloy. The table 116 is configured to move in multiple directions as needed to position the substrate 114 for surface preparation and coating. In an exemplary embodiment, the thermal spray torch 110 and laser device 112 can be manipulated with the table 116 remaining stationary.

In an alternative embodiment, the substrate 116 can be located outside of the chamber 100, such as at a work site, on a bridge, on an engine and the like.

A hydroxide layer 118 is shown on the surface 120 of the substrate 116. In an alternative embodiment, the layer 118 can comprise a polymer based layer which may be a paint, a primer, erosion resistant layer. Examples include an epoxy based strontium-chromate containing primer for corrosion protection and a polyurethane erosion resistant layer.

The hydroxide layer 118 is created as a result of the aluminum base alloy substrate 114 being exposed to air containing humidity or being processed with an alkali cleaning method. The hydroxide layer 118 is considered to be a contaminant on the surface 120 of the substrate 114. The hydroxide surface layer 118 is shown as partially removed from the surface 120.

The laser 112 is shown emitting laser radiation 122 for laser ablation of the hydroxide surface layer 118. The surface 120 of the substrate 114 is also shown to be roughened forming a design surface texture 124 by laser ablation roughening. The surface roughening ensures good mechanical coupling between the abrasive coating and the substrate 114. The design surface texture 124 can comprise features 126 on the order of 60 micron resolution. The laser ablation roughening would result in extremely small (merely single microns) thermal effect depths on the substrate 114.

The ablation can include local vaporization of the layer 118 having a depth of from about 30 to about 50 microns. The ablation may vaporize, melt and displace the surface 120. The ablation can be performed in a predetermined pattern, such as a hexagonally closed packed matrix, (i.e., honeycomb) or in an overlapping pattern to produce a more randomized distribution of displaced material and smaller roughened depth.

The laser 112 can comprise a variety of lasers with various outputs. In an exemplary embodiment, the laser can include a fiber optic laser that produces a uniform intensity across the projected spot with a rapid drop-off at the edges of the projected spot, creating a square wave distribution and a controlled energy distribution. The laser energy distribution is more evenly distributed across the effective ablation area. Thus, it can more discretely remove a first surface layer 118 without damaging the outer portions of the tip 78. The laser 112 can be located in the booth 100 to save process time.

The laser 112 can also be used to preheat the surface 120 of the substrate 114 before the coating takes place. In exemplary embodiments, preheating may not be required when the sprayed coating is applied immediately after the ablation steps.

Figure 5:
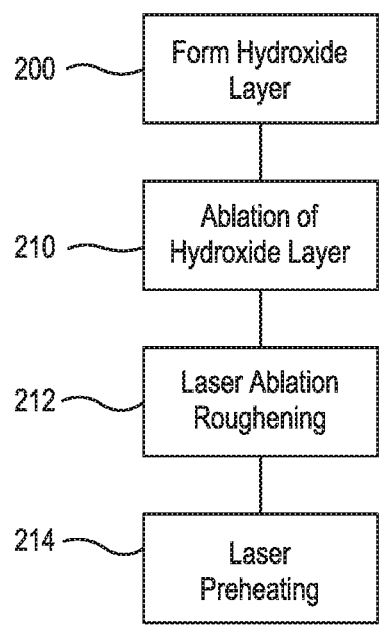
FIG. 5 is a process diagram for the exemplary blade tip preparation and deposition process.

Referring to FIG. 5 a process diagram of the exemplary process is shown. The process begins at step 200 were the surface of the blade tip is cleaned and a hydroxide layer is formed. The blade is attached to the table 116. At step 210 the laser ablation of the hydroxide layer is performed. At step 212 the laser ablation roughening of the surface of the blade tip is performed. An optional preheating step 214 can be performed, if required. The surface of the blade tip can then be coated by use of the thermal spray torch to form the abrasive coating.

Advantages of the process include eliminating the ergonomic and quality risks of the manual abrasion process.

Advantages also include reducing processing time by about 7-10 minutes per part by replacing abrasion and grit blast.

Improved bonding quality may allow reduced preheat temperature and preheat process time.

In the overhaul process where polymer adhesives are used to bond the leading edge sheath and core cover plate, the improved bonding may allow reduction of preheat temperature and help to protect the adhesives from thermal damage.

Capital cost for the laser ablation equipment would be similar to a grit blaster, but the footprint and operating costs would be smaller and used abrasive waste stream eliminated.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

There has been provided the coating preparation process for abrasive blade tips. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An apparatus for preparation and thermal spray deposition of an aluminum alloy fan blade for a fan section of a gas turbine engine comprising:

a laser configured to ablate at least one hydroxide layer on said aluminum alloy fan blade for the fan section and said laser configured to laser ablation roughen a surface of said aluminum alloy fan blade for the fan section to a depth of from 30 to 50 microns;

a thermal spray torch mounted with said laser in a thermal spray chamber, said thermal spray torch being configured to apply a coating to said laser ablation roughened surface of said aluminum alloy fan blade for the fan section.

2. The apparatus according to claim 1, wherein said laser comprises a square wave output.

3. The apparatus according to claim 1, wherein said coating comprises an abrasive tip coating.

4. The apparatus according to claim 1, wherein said laser ablation roughened surface comprises a design surface texture.

5. The apparatus according to claim 1, further comprising:

a coating applied to said laser ablation roughened surface of said component; wherein said coating is selected from the group consisting of a spray paint, a primer and a powder coating.

6. A process of preparing an aluminum alloy blade tip for abrasive coating, the aluminum alloy blade for a fan section of a gas turbine engine, the process comprising:

forming a first layer on a surface of said aluminum alloy blade tip, said aluminum alloy blade being from the fan section of the gas turbine engine;

ablating said first layer from said surface with a laser;

roughening said surface to a depth of from 30 to 50 microns with said laser after said first layer ablation; and preheating said surface with said laser prior to coating said surface.

7. The process according to claim 6, wherein said first layer comprises at least one of a polymer based layer, an erosion resistant layer and a hydroxide layer.

8. The process according to claim 6, wherein said hydroxide layer is formed from at least one of after alkali cleaning said surface, after exposure to air containing humidity.

9. The process according to claim 6, further comprising; coating said surface with an abrasive.

10. The process according to claim 9, wherein said steps of ablating, roughening and coating are performed in a thermal spray chamber.

11. The process according to claim 6, wherein said roughening step comprises laser ablation roughening.

12. The process according to claim 11, further comprising:

forming a designed surface texture from said laser ablation roughening.

* * * * *